United States Patent [19]
Butter et al.

[11] Patent Number: 5,528,594
[45] Date of Patent: Jun. 18, 1996

[54] METHOD AND SYSTEM FOR IMPLEMENTING SUB-TOKENS ON A TOKEN RING NETWORK

[75] Inventors: Adrian S. Butter, Binghamton, N.Y.; Chang Y. Kao, Boulder, Colo.; James P. Kuruts, Forest City, Pa.

[73] Assignee: International Business Machines Corporation, Armonk, N.Y.

[21] Appl. No.: 363,432

[22] Filed: Dec. 22, 1994

[51] Int. Cl.⁶ .................................................. H04L 12/427
[52] U.S. Cl. ................ 370/85.5; 370/85.12; 395/182.02
[58] Field of Search ..................................... 370/85.4, 85.5, 370/85.12, 15, 16, 16.1, 85.9; 371/11.2, 11.1; 340/825.05; 395/200, 182.01, 182.02

[56] References Cited

U.S. PATENT DOCUMENTS

| | | | |
|---|---|---|---|
| 4,602,365 | 7/1986 | White et al. ............................ | 370/89 |
| 4,803,485 | 2/1989 | Rypinski ................................ | 340/825 |
| 4,899,142 | 2/1990 | Nakayashiki et al. ............. | 340/825.050 |
| 4,937,823 | 6/1990 | Bekki .................................... | 371/11.2 |
| 5,081,452 | 1/1992 | Cozic ................................. | 340/825.05 X |
| 5,081,623 | 1/1992 | Ainscow ............................... | 370/85.4 |
| 5,146,452 | 9/1992 | Pekarske ............................ | 371/11.2 X |
| 5,155,726 | 10/1992 | Spinney et al. ..................... | 370/85.5 |
| 5,299,312 | 3/1994 | Rocco, Jr. ......................... | 370/16.1 X |
| 5,333,270 | 7/1994 | Brief et al. .......................... | 395/200 |
| 5,383,191 | 1/1995 | Hobgood et al. ................. | 370/16.1 X |

Primary Examiner—Douglas W. Olms
Assistant Examiner—Min Jung
Attorney, Agent, or Firm—Baker, Maxham, Jester & Meador

[57] ABSTRACT

A method and system for increasing performance on a standard dual ring token ring by generating one or more sub-tokens so that multiple data transmissions can occur concurrently. Upon receipt of a data frame from the token holder, interface logic enables a receiver to generate a sub-token frame. The sub-token is used to notify the next downstream station that it may transmit data frames to other downstream stations. In this way, a second data transmission path can be established between downstream stations. In a similar manner, the receiver of a data frame sent by a sub-token owner will generate a sub-token frame for use by the next downstream station when its data arrives. Each sub-token is used to create a new sub-ring, thus allowing for concurrent data transmissions. Each new sub-ring must obey token ring protocol to avoid data collisions.

28 Claims, 10 Drawing Sheets

METHOD AND SYSTEM FOR IMPLEMENTING SUB-TOKENS ON A TOKEN RING NETWORK

BACKGROUND OF THE INVENTION

1. Field of the Invention

The present invention relates to a method and system for improving performance of data transmissions on a local area network, and more particularly to the implementation of logic for creating sub-tokens on a dual ring token ring network.

2. Description of the Related Art

A local area network (LAN) is a collection of interconnected data processing resources, such as computers and printers, that may communicate and share each other's resources. The designation of "local" is a relative term, but a typical implementation of a LAN spans a single building or a group of neighboring buildings. Design choices for implementing a local area network include physical considerations such as type of media (e.g. coaxial cable, twisted pair, or fiber optics) and physical topology (e.g. bus, tree, star, or ring). Additionally, there are logical considerations which include access control and logical topology. The logical topology refers to how information is passed on the network. Access control is a broad term that generally refers to the control of data traffic on the network and typically is achieved by the use of one or more protocols.

The implemented protocol determines which stations have priority to access the media to send data and often depends on the physical and logical topology. On a bus topology, such as the one implemented by the Ethernet product (IEEE 802.3 protocol), access to the media is on an "as available basis" and software techniques are employed to manage media access. Such techniques include "data carrier detection" to determine if the media is busy, and "collision avoidance" to prevent garbled messages from two or more stations transmitting simultaneously.

Collisions are avoided in a ring topology implemented by the token ring product (IEEE 802.5 protocol), because a single "token" is used to gain access to the media. The token is a control signal, that circulates from one station to another until it is "seized" by a station that wishes to send data. Since a station can not send data without gaining control of the token, collisions are inherently avoided. The station seizing the token is known as the "sender" and a station designated as the destination is known as the "receiver." The sender station is said to have entered "transmit mode"—a mode only available to the token holder with the prior art protocols. All of the other stations on the ring, including the receiver station are in "listen mode".

The information circulates from one station to the next around the ring. Each bit arriving at a station's interface is copied into a 1-bit buffer and then copied back onto the ring, introducing a 1-bit delay time for each interface. While the information is in the buffer, each bit can be inspected. During this inspection, the receiver can recognize its address and copies all of the data designated as a "data frame" from the interface to the station's data bus. The sender will typically require several transmissions to send all of its intended message, depending on factors such as bandwidth (e.g., IBM provides a coaxial cable based token ring product that transmits 7 at 4 Megabits per second and also at 16 Megabits per second). Typically, the first bit of a "full frame" will circulate all the way around the ring and return to the sender before the entire frame has been transmitted. The full frame comprises the data frame and also other frames, including source and destination address. The sender is responsible for stripping each bit of data from the ring as it returns.

A station may hold the token for a predetermined "token holding" time. Typically this time is 10 msec, and is set at installation. If there is enough time left after the first frame has been transmitted then the sender may send more frames. If more time is needed to send additional frames, then the sender regenerates a 3 byte token frame, which it also seizes. If the last frame has been sent, a new token is regenerated but released onto the ring.

One particularly fast token ring network, which uses optical fiber, is known as the fiber distributed data interface (FDDI) and has a bandwidth of 100 Megabits per second. The basic FDDI protocol is closely modeled on the 802.5 protocol, but accounts for the increased capability of optical fiber. Optical FDDI networks are capable of supporting up to 1000 stations spanning a distance of 200 kilometers. If the 802.5 protocol were not deviated from, there would be a considerable time penalty introduced because new data frames could not be sent until a previous data frame had traveled all the way around the ring, back to the sender. Therefore, the FDDI protocol allows a sender to regenerate a new token as soon as it sends its last frame, without waiting for the frame to circulate to every station. But in most other ways, FDDI permits data structures very similar to 802.5, including acknowledgement bits in a frame status byte to indicate that data has been received.

There are two principal types of FDDI rings, a class A configuration and a class B configuration. The class B configuration employs a single ring, while the class A configuration employs a dual ring structure. In class A configurations, the primary ring is used for normal data transmissions and the secondary ring is a backup ring that is only used if there are problems with transmitting on the primary ring. The ring is automatically reconfigured in the event of a failure on the primary ring.

Clearly, it would be an advancement to the art to be able to employ both rings for concurrent data transmissions without degrading the reliability of the class A configuration. Further, it would be advantageous to employ the two rings for simultaneous transmissions without having to isolate the two rings from each other to avoid data collisions.

SUMMARY OF THE INVENTION

An objective of the present invention is to improve the performance of a dual ring token ring network.

A further objective of the present invention is to improve the performance of a dual ring network by allowing multiple concurrent data transmissions.

A still further objective of the present invention is to provide the advantages of meeting the above objectives without degrading the reliability and fairness of the network.

These objectives are by met by implementing logic that generates one or more sub-token rings to allow concurrent data transmissions on a standard dual ring configuration. A new protocol is employed to manage the transmission of data on the multiple rings.

The objects and advantages of the present invention will best be understood with reference to the Drawing and the Detailed Description below.

DETAILED DESCRIPTION OF THE PREFERRED EMBODIMENTS

The present invention builds upon the physical and logical topology of a Class A FDDI token ring—a dual ring configuration. The invention employs logic that implements a new protocol with novel data structures in order to improve performance. It is useful to show the basic FDDI ring operating under a conventional protocol prior to introducing the new protocol and new data structures. In the following figures, the same numbers and letters appearing in different figures of the drawing represent the same or identical elements.

Basic FDDI Dual Ring Protocol

Figure 1:
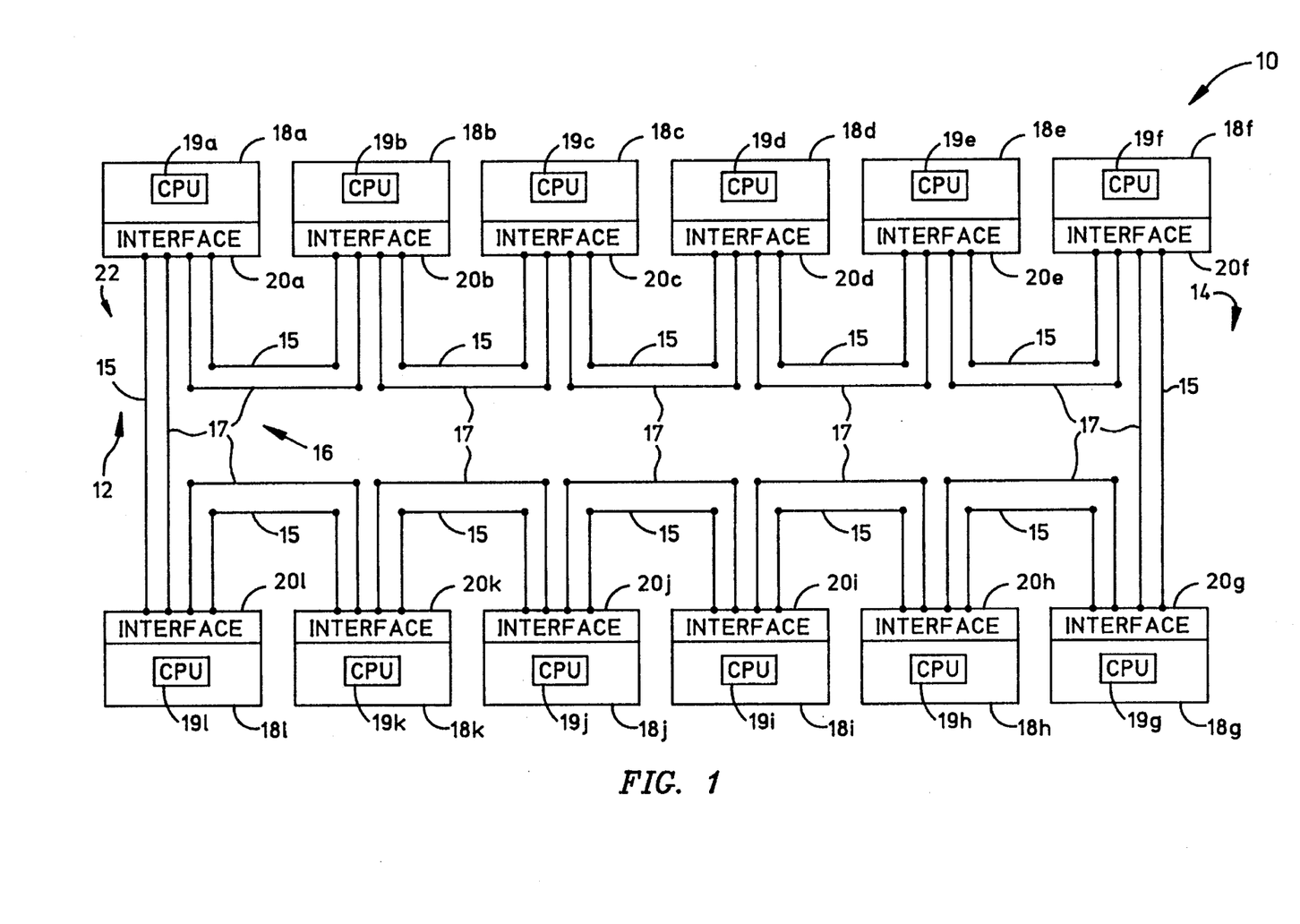
FIG. 1 is a block diagram of a dual ring token ring network useful for implementing the present invention.

Referring to FIG. 1, a topology of a dual ring token ring network 10 which is preferably employed to implement the present invention is shown. The primary ring comprises medium 15 and each station interface 20a–l. Similarly, the secondary ring 16 comprises medium 17 and each station interface 20a–l. The primary ring 12 is used to transmit a token and data around the ring in direction 14 according to a conventional token ring protocol, such as the IEEE 802.5 protocol or the FDDI protocol. Each station 18a–l has a respective interface 20a–l that allows for transmitting and receiving data on the ring. Each station further has a respective central processing unit (CPU) 19a–l for communicating with the interface unit and for controlling the station. A secondary ring 16 is used to transmit a token and data around the ring in direction 22, but this ring is only used if there is a fault on the primary ring. The medium for each respective ring is preferably optical fiber.

Information is transferred sequentially from one active station to the next active station. The direction of data flow is referred to as the "downstream" direction. Thus, station 18a is upstream from all the other stations on the primary ring. Conversely, stations 18b–l are each downstream from station 18a.

The secondary ring 16 is available in an FDDI class A configuration for fault tolerance. It is placed into operation by switching logic in each station interface that is reconfigured for operating on the secondary ring. However, the present invention is based on the inventors' critical recognition of a means for employing the secondary ring concurrently with the primary ring to increase the number of concurrent data transmissions on the network.

Referring again to FIG. 1, the following example illustrates the flow of data on the network. Sender station 18a is holding a token, allowing it to have access to medium 15 and send data to designated receiver station 18f. Thus, only station 18a is allowed to transmit information on the ring in a normal token ring configuration. The information is transferred sequentially from 18a to downstream neighbor 18b and then is passed to the next downstream neighbor, and so forth to each succeeding downstream neighbor. Stations 18b–18e essentially repeat each bit received with the above described 1-bit delay. The receiver station 18f, recognizing its address in the data frame, copies the information as it passes on its way back to station 18a. Upon sending its final data frame, station 18a removes the information from the ring and regenerates a token, which it releases. If placed into operation, the secondary ring obeys a conventional token ring protocol and the data flow is in direction 22. By employing sub-token generating logic, as described in detail below, the inventors have provided a way to increase the performance of a token ring network by dynamically reconfiguring the physical topology of the ring so that multiple transmissions can occur concurrently.

Station Interface

Figure 2:
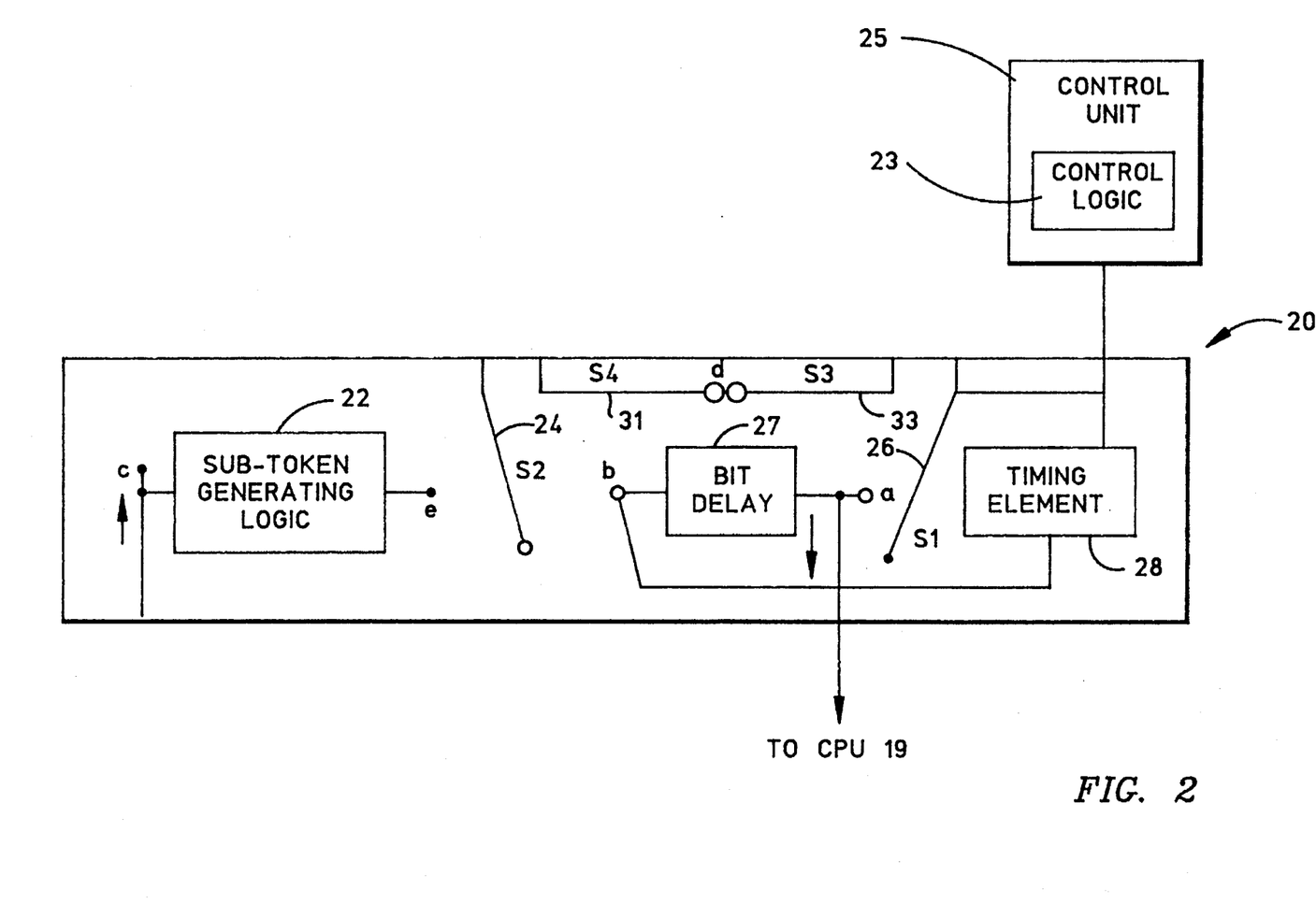
FIG. 2 is a schematic representation of a station logic interface useful for implementing the present invention.

A preferred embodiment of an interface unit for implementing the present invention is shown in logic schematic 20. It is envisioned that the invention will be implemented as part of a station's electronic hardware; however, the inventors recognize that the invention can be totally implemented in software without departing from the spirit of the invention. Preferably the invention is implemented as an adaptation to existing token ring interface cards, such as the IBM token ring interface card for FDDI. The preference exists because of the ease of implementing the invention by improving pre-existing card interface technology. However, the invention can be implemented on any well known computer usable medium, such as tape or disk, that contains equivalent logic to that shown in schematic 20 and implements the method steps described above.

Referring to FIGS. 1 and 2, the use of primary ring 12 and secondary ring is controlled by the position of switches S1 26, S2 24, S3 33, and S4 31. The position is controlled by control unit 25 through its control logic 23. The control unit may be a conventional microprocessor, well known in the art, and preferably is part of the interface circuitry but may also reside in the station. A 1-bit delay element 27 is implemented by a station in listen mode to examine passing data, and it is activated by placing the appropriate switch positions as shown below in Table 2. The data is passed to a station's CPU 19 which is identical to CPUs 19a–l (FIG. 1). The 1-bit delay element is not used when the station is sending data in transmit mode. A control timing element 28 is used to enforce the token-holding time on the station having seized the token. Sub-token generating logic 22 is used to implement the present invention and will be discussed in detail below.

Table 1 shows the position of the switches in the interface of a token owner in a conventional FDDI implementation, such as the position of the switches in interface 20a of station 18a.

TABLE 1

| Primary Ring Token Owner Configuration | |
|---|---|
| Switch | Position |
| S1 | a |
| S2 | c |
| S3 | d |
| S4 | d |

Table 2 shows the position of the switches in the interface of a downstream station, such as the interface 20f of station 18f, in "listen" mode.

TABLE 2

| Receiver Configuration | |
| --- | --- |
| Switch | Position |
| S1 | a |
| S2 | b |
| S3 | d |
| S4 | d |

In the event that the secondary ring needs to be used for transmitting data because fault recovery operation is required by control logic 23, the switches S3 and S4 will be thrown to alternative positions as shown in Table 3. The position will depend upon whether the station sensing the fault is upstream or downstream (using the primary ring for reference) from the failing node. And the position will further depend on whether the station detecting the fault is in listen mode or transmit mode. In fault recovery mode the secondary ring is used to transmit data in the opposite direction of the primary ring and to by-pass stations that are in-between itself and the intended receiver station. In this mode, the interface logic switches are changed within two stations—the station immediately upstream and immediately downstream from the fault. Table 3 shows the positioning of the switches in fault recovery mode.

TABLE 3

| Fault Recovery Configuration | | | |
| --- | --- | --- | --- |
| Switch | Position | Relative Location to Fault | Mode |
| S3 | b | Downstream | Listen |
| S3 | c | Downstream | Transmit |
| S4 | a | Upstream | Either |

Sub-token Protocol

In order to support the new protocol of this invention, the receiver uses the generating logic 22 to generate a sub-token. In order to clarify the roles of respective stations on the network, it is best to introduce some new terminology. When station 18a seizes the token, in conventional terminology it is referred to as "the sender". In order to distinguish this sender from subsequent sender stations, enabled as such by the present invention, new terminology is introduced. The original sender is referred to as the "first order sub-token owner." The designated receiver of a first order sub-token owner is a "first order receiver." The "first order" sub-ring is comprised of the first order sub-token owner and each subsequent downstream station, up to and including the first order receiver. For a very brief period, the first order sub-ring will comprise all stations on the ring. The timing of this brief period is after the first order sub-token owner reconfigures the dual ring and prior to designating a receiver. The receiver 18d is referred to as the "second order sub-token generator." The second order sub-token generator differs somewhat from the first order holder, in that it cannot hold the sub-token which it generates. Instead the sub-token is generated for the benefit of a downstream neighbor to seize and therefore becomes the "second order sub-token holder". It is this second order sub-token holder that may generate new data frames. The "second order" sub-ring is comprised of the station immediately downstream from the second order sub-token generator and all downstream stations up to but not including the first order sub-token owner.

The designated receiver of a second order sub-token owner is a "second order receiver." If the second order receiver is located upstream from the first order sub-token owner and downstream from the second order sub-token owner, then it may generate a new "third order" sub-token and form a third order sub-ring. In general, an "$n_i$ order" sub-ring has a corresponding "$n_i$ order sub-token holder" that seizes a sub-token frame, and sends a data frame to an "$n_i$ order receiver." Each $n_i$ order ring may include the station immediately downstream from the $n_i$ order sub-token generator and any downstream stations, up to, but not including the first order sub-token owner. Thus, the initial configuration of each $n_i$ order sub-ring includes fewer stations than the initial configuration of the $n_{i-1}$ order sub-ring. Thus, for a ring comprised of "m" stations, a maximum of m/2 concurrent data transmissions can be supported. If the number of "m" stations happens to be odd then the value for m/2 is truncated to the integer value. For example, either 12 or 13 stations on a dual ring would support up to 6 concurrent data transmissions on configured sub-rings.

Referring to FIG. 2, the reconfiguring of a primary ring and a secondary ring into one or more sub-rings is implemented by control logic 23 throwing switches according to the protocol of the present invention. The following Tables 4, 5, and 6 illustrate the correct positions for each switch to enable a particular configuration.

TABLE 4

| First Order Sub-token Owner Configuration | |
| --- | --- |
| Switch | Position |
| S1 | d |
| S2 | c |
| S3 | d |
| S4 | a |

TABLE 5

| $n_i$ Order Receiver/$n_{i+1}$ Order Sub-token Generator Configuration | |
| --- | --- |
| Switch | Position |
| S1 | a |
| S2 | c |
| S3 | b |
| S4 | e |

TABLE 6

| $n_i$ Order Sub-token Owner Configuration ($n_i \neq 1$) | |
| --- | --- |
| Switch | Position |
| S1 | a |
| S2 | c |
| S3 | d |
| S4 | d |

New Data Structure used by Sub-token Protocol

Figure 3:
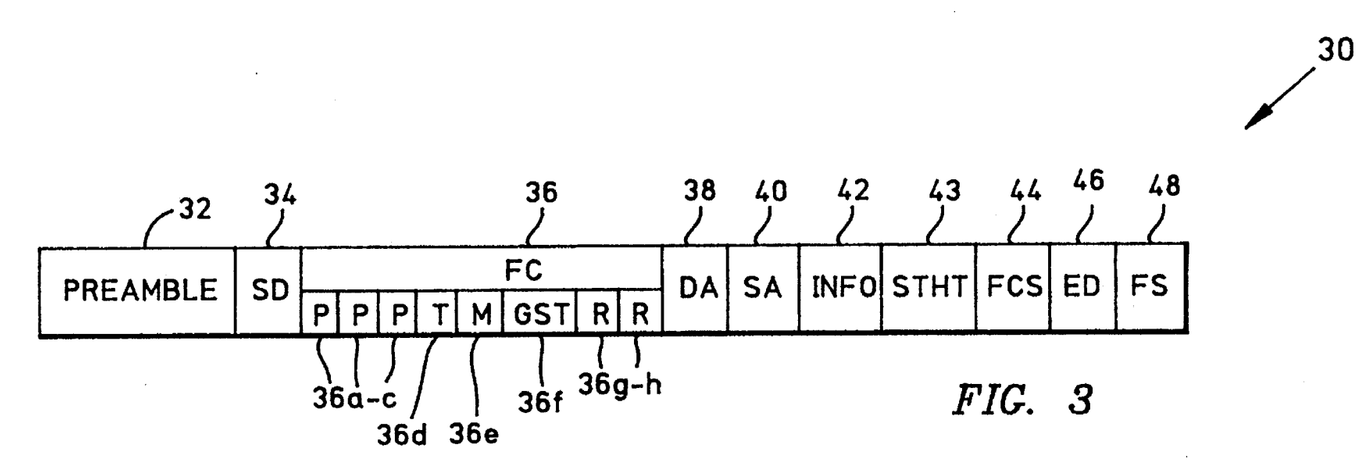
FIG. 3 shows a new data structure for a sub-token data frame that is implemented by the present invention.

The invention provides new data structures for implementing the protocol of the invention. Referring to FIG. 3, a data frame 30 is passed by a token holding station for receipt and copying by a receiver station. The data frame is comprised of the following fields. The Preamble field 32 is used to synchronize the data frame 30 with the local station's clock. The SD field 34 marks the frame 30's starting boundary, while the Ending Delimiter (ED) field 46 marks the ending boundary. The FC field 36 is used to distinguish this frame as a data frame. The Destination Address (DA) field 38 indicates a receiving station for which data is to be sent. The Sender Address (SA) field 40 is used for the sender station to indicate its return address for receiving an acknowledgment from a receiver station. The INFO field 43 is used for writing the data to be sent to the receiver, which is indicated by address DA. The Frame Check Sequence (FCS) field 44 is used for error checking.

The first order sub-ring is used by the second order sub-token generator to send back an acknowledgement frame to the first order token holder. This is done by modifying bits of the Frame Status (FS) Field 48 of the Data Frame 30, in the following manner. The FS field is preferably a byte that is used for acknowledgement. The byte contains a bit referred to as an A bit and another referred to as a C bit. When a frame arrives at a receiving station, the A bit is turned on. Only if the frame is copied is the C bit turned on. Thus, the inverting of the A and C bits can be used by a sending or transmitting station to examine for acknowledgment when a frame returns from its journey around the ring. Typically the A and C bits are duplicated within the same FS field to ensure reliability.

In order to maintain compatibility with existing token ring hardware, the new protocol requires some modifications to the existing data structures. The new data structure includes an extension to the conventional frame control (FC) field. Normally, the token ring protocol requires a 3-bit reservation field within the 1 byte FC field. The new data structure of the FC field 30 replaces a reservation bit with a generate sub-token (GST) field 36-f which indicates whether a downstream receiver may generate a sub-token. If the GST field is marked active, the $n_i$-order receiver can reconfigure itself as an $n_{i+1}$ order sub-token generator and generate a sub-token for use by a downstream station.

Referring to FIG. 3, other bit fields shown in the FC field 36 serve conventional roles well known in the art, and are discussed briefly for the sake of completeness. Priority bits 36a–c are used to establish transmission priority on the ring. A token bit 36d indicates if the frame is a token frame or not. A monitor bit 36e provides that a given station monitors the ring for error control and back up purposes. Two reservation bits 36g–h replace three reservation bits of a conventional format, and are used in conjunction with priority bits 36a–g to establish transmission priority.

Figure 4:
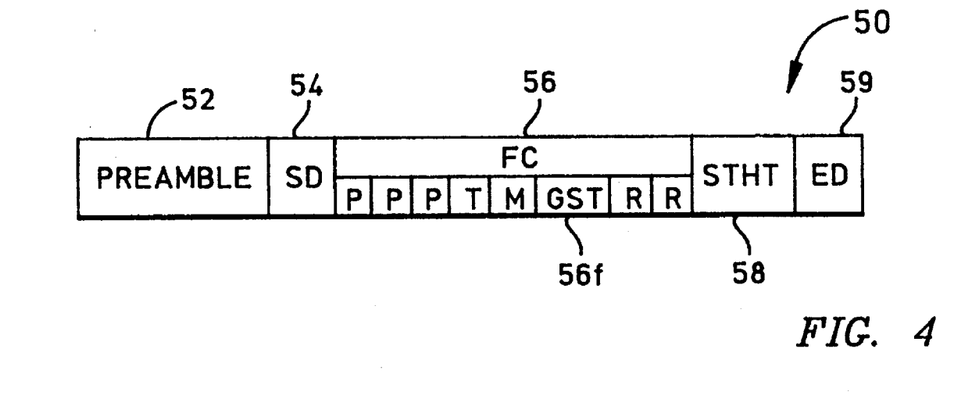
FIG. 4 shows a new data structure for a sub-token frame that is implemented by the present invention.

Referring to FIG. 4, the new data structure also includes a sub-token (ST) frame 50 that is passed in an identical fashion to a token frame according to FDDI protocol. A station downstream from the sub-token generator acting in "listen mode" seizes the ST frame when it has data to send out. The downstream station converts the ST frame 50 to the data frame 30 and enters "transmit mode" to send the data to a downstream receiver. If the GST field in the data frame is marked inactive, the down stream receiver may not become a new sub-token generator. The ST frame includes a frame control (FC) field 56 that is identical to the FC field in the data frame, including GST field 56f.

Referring again to FIG. 4, the sub-token frame includes a Preamble field 52, which is used for synchronizing the frame 50 with the local clock of any station 12 on the sub-ring on which the sub-token is being passed. A Starting Delimiter (SD) field 54 is used to mark a frame boundary for the Frame Control (FC) field 56 and a new sub-token hold time (STHT) field 58. The Ending Delimiter (ED) field 59 marks the end of the sub-token frame.

Referring to FIGS. 3 and 4, a sub-token hold time (STHT) field 43 in the data frame is generated based on the STHT field 58 in the sub-token frame. Each sub-token generator must create a new sub-token hold time and place it in its sub-token frame. Each sub-token owner must place a corresponding STHT field in its data frame. Sub-token hold time is enforced to maintain the degree of fairness established by the conventional FDDI protocol. The sub-token hold time is used to enforce timing restrictions on the existence of sub-tokens and sub-rings. Each succeeding STHT on a new sub-ring must be less than a previous STHT for a lower order ring. Sub-tokens are only allowed to exist from the time the first-order sub-token holder allows a sub-token to be created until the first order sub-token is passed along to the next downstream neighbor. The STHT field is used by the sub-token owner to define how many messages it may transfer to downstream stations before it is required to destroy the sub-token. The sub-token generator uses this field to define when it will destroy the sub-token ring and reconnect the first order sub-ring. The timing element 28 is used by the interface logic to monitor actual time elapsed and compare it to the STHT field for a particular sub-ring. The STHT value must be a time that is less than the main token holding time.

Sub-ring Reliability Considerations

It should be noted that since the station topology of the each subsequent sub-ring is not known to the first order ring and the lower order sub-rings, it is possible for a station to be unavailable to receive data because it has been configured into a higher order sub-ring. In this case, the protocol mandates that the first order sub-ring or the lower order sub-ring will receive a message to indicate that the intended receiver is not present. Since the intended receiver is only connected to the higher order sub-ring, indicating bits in the FS field 48 are not changed. This indicates to the sender that the data frame must be transmitted later.

It is also possible that a sub-token generator may pass out a sub-token frame to a potential sub-ring that consists of only one station. To protect against the endless circulation of the sub-tokens on a sub-ring, the sub-token generator must monitor the next downstream sub-ring and remove the sub-token frame if such a situation is detected. This scenario exists when the only downstream station from the sub-token generator is the first order token holder, or if no station that is connected to the sub-ring has data to transmit.

Operation of the Sub-rings

Figure 5A:
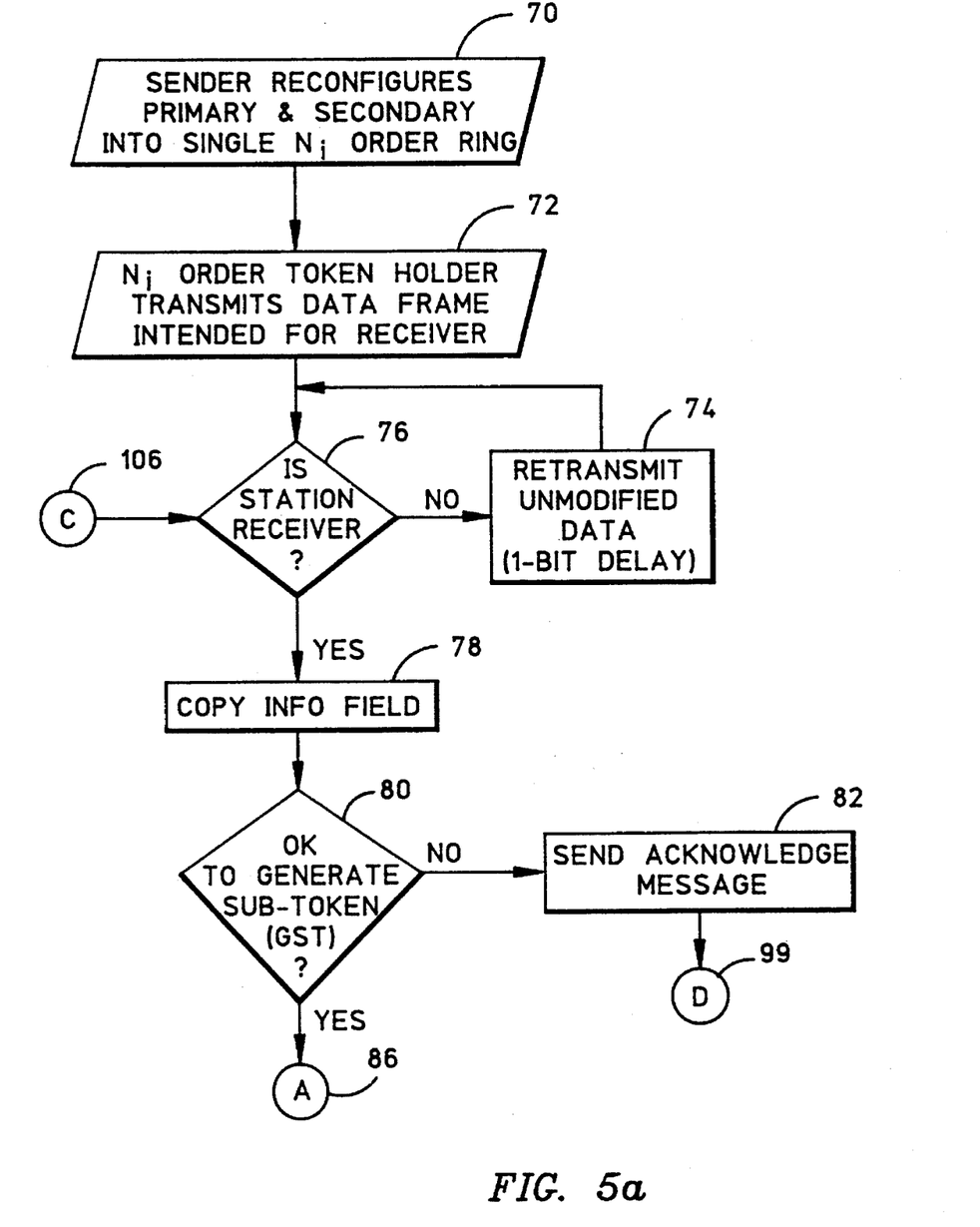
FIGS. 5a, 5b, and 5c are flow diagrams illustrating a method of implementing the present invention employing the logic interface of FIG. 2 with the data structures of FIGS. 3 and 4.
Figure 5B:
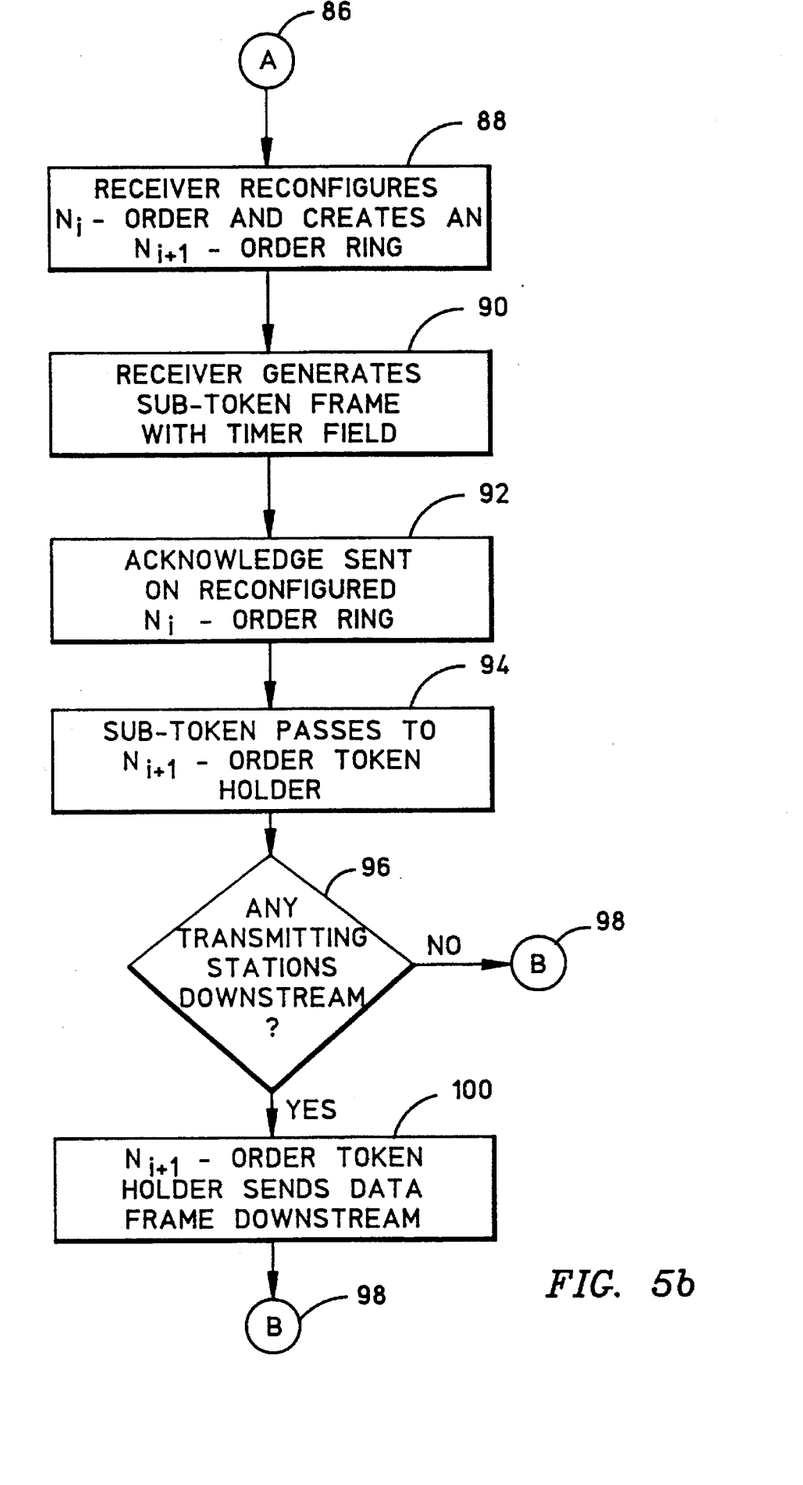
Figure 5C:
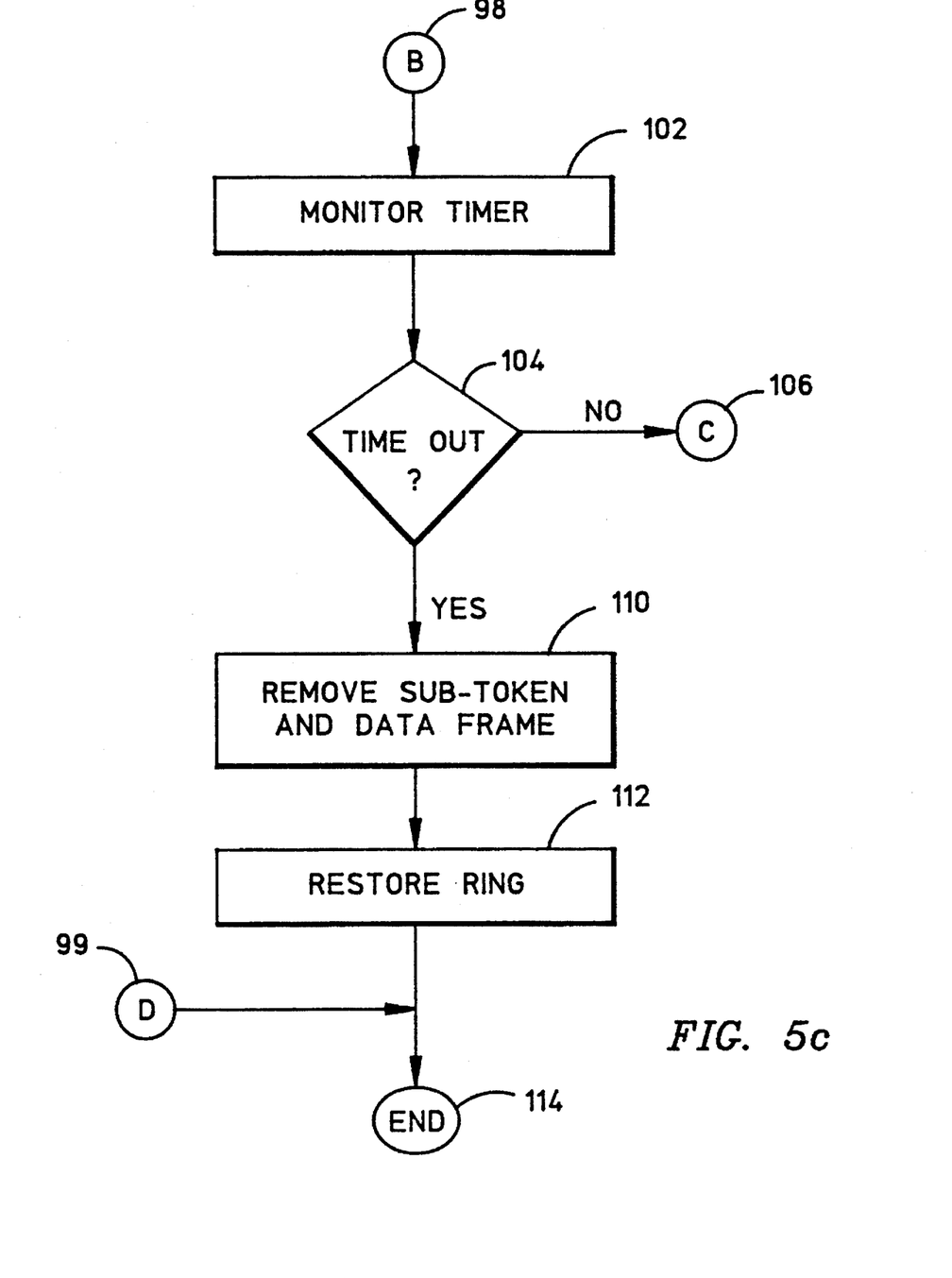

FIGS. 5a–5c show the implementation of a method of using the data structures of FIGS. 3 and 4 according to a new protocol implemented with the present invention. The method is best understood with reference to the depicted reconfigurations of the physical topology of FIG. 1, as shown in FIGS. 6–9.

Figure 6:
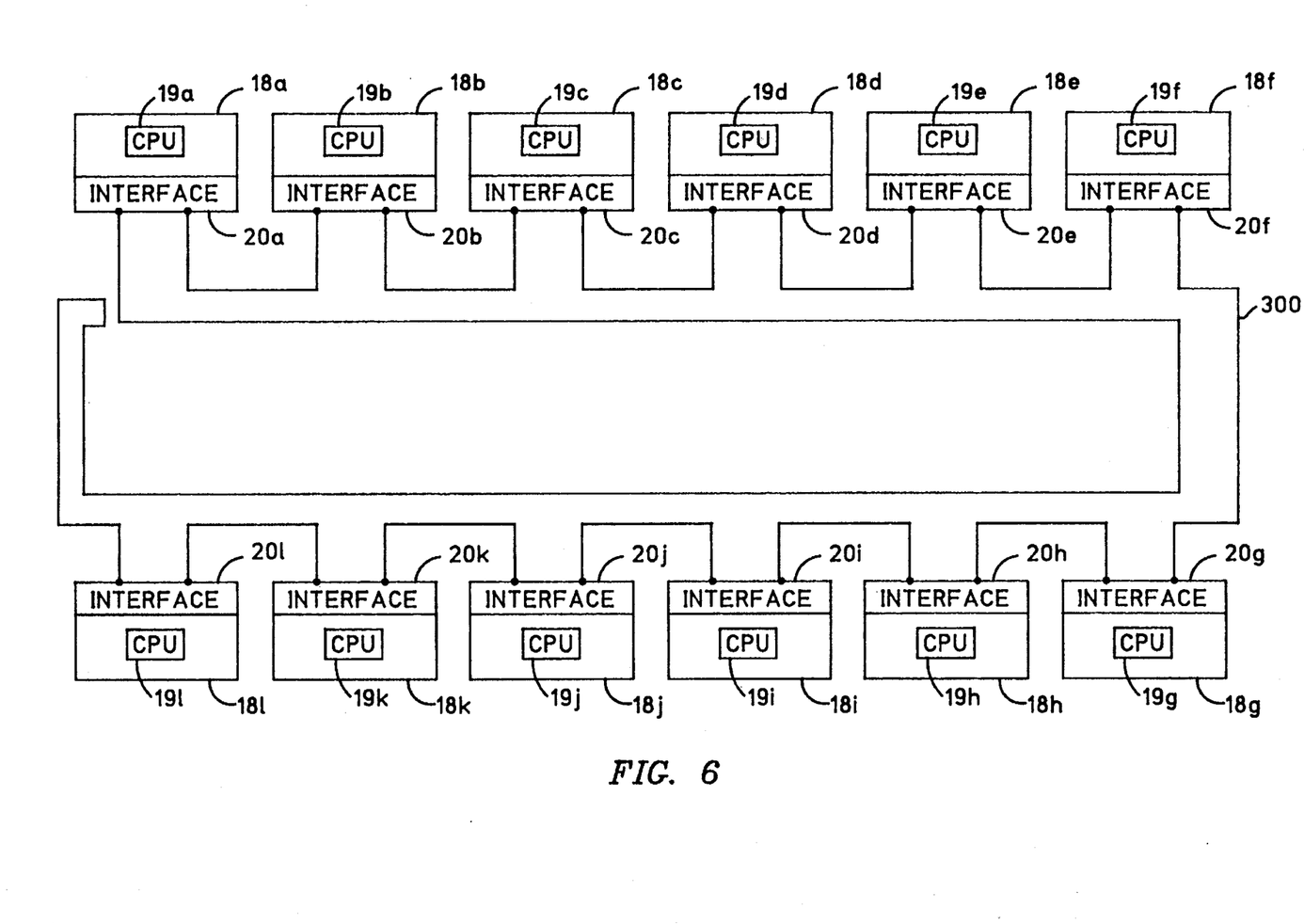
FIGS. 6, 7, 8, and 9 are block diagrams of the network of FIG. 1 after being reconfigured according to the method steps of FIGS. 5a–5c.

Referring to FIGS. 5a, 5c, and 6, when Station 18a seizes the main token on the primary ring it may then reconfigure the dual rings by moving switch positions according to Table 4. Station 18a is acting as the first order sub-token holder when it does this. In step 70, the sender station 18a reconfigures the primary and secondary ring into a first order sub-ring 300. In general this is a creation of one $n_i$ order ring from a dual ring. The first order sub-ring 300 can be reconfigured by later creations of sub-rings, but initially comprises each station 18a–18l. In step 72, station 18a, as first order sub-token holder, transmits a data frame that is intended for station 18f. As the data frame passes downstream each station is in listening mode. In step 76, each station determines if it is the intended receiver by examining the data field DA in the data frame to determine if the message is intended for that station. Thus, stations 18b–18e would each retransmit the unmodified data after passing through the 1-bit delay element 27, in accordance with step 74. Station 18f, as the first order intended receiver copies the data in the INFO field, per step 78. In step 80, the station 18f then examines the GST field of the data frame to determine if it can generate an sub-token and reconfigure the existing sub-ring to create an additional second order sub-ring. If the answer is "no", then the station sends an acknowledge message back by modifying the A and C bits in the FS field, per step 82. Processing in the flow chart passes to connecting step 99, which flows to process ending step 114 (FIG. 5c).

Figure 7:
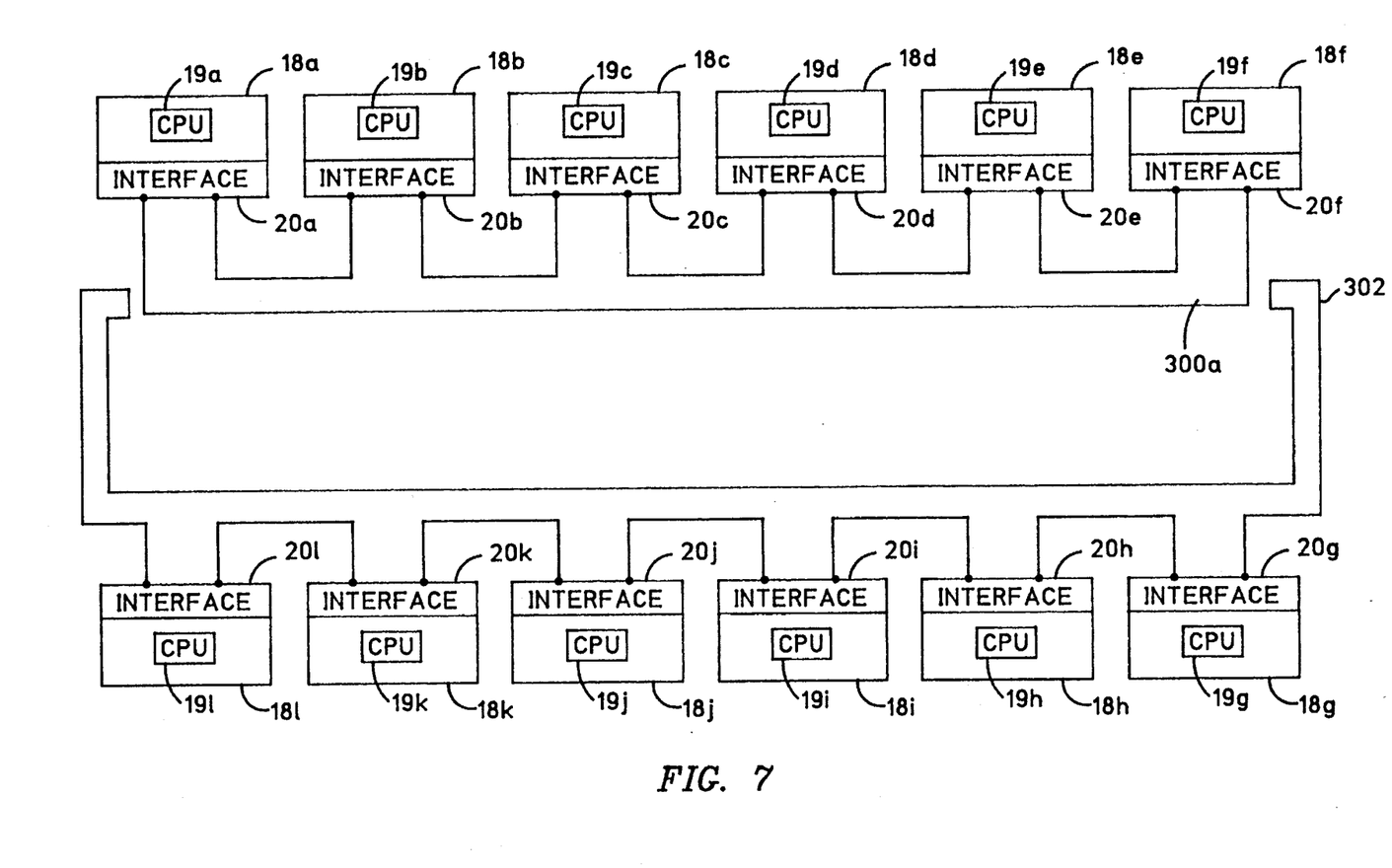

Referring to FIGS. 5a, 5b, 6 and 7, if the answer to the inquiry is "yes", then the step 86 is implemented to connect to step 88. In step 88, station 18f, having assumed a new role as second order sub-token generator reconfigures the first order sub-ring and creates a second order sub-ring. The newly configured first order sub-ring 300a comprises stations 18a–18f. Second order sub-ring 302 comprises stations 18g–18l. The sub-rings 300a and 302 are physically separate and may not communicate with each other. In general, before the generation of a sub-token frame a reconfiguration of a $n_i$ order sub-ring and the creation of a new $n_{i+1}$ order sub-ring occurs unless there are no more stations downstream or the STHT time has been exceeded. In step 90, the receiver station 18f generates a sub-token frame and places a new STHT field in it. The new STHT field is less than the previous STHT field so that fairness is maintained on the sub-rings. The new sub-token frame is passed downstream where the sub-ring 300 (FIG. 6) is reconfigured into sub-ring 300a (FIG. 7).

Referring again to FIGS. 5b, 5c, and 7, an acknowledgement is sent on sub-ring 300a, in accordance with step 92. In accordance with step 94, any station downstream, such as station 18g, may become the second order sub-token holder by seizing the sub-token if it has data to sent. Generally speaking, in step 94, the sub-token is seized by any downstream station, which then becomes the $n_{i+1}$ order sub-ring token holder. Step 96 implements a safety measure to prevent endless passing of a data frame on a sub-ring having only one station. This problem is described above under the sub-titled section, "Sub-ring Reliability Considerations". If there are no stations downstream, then processing in the chart passes to step 98. Step 98 flows to steps encompassing the monitoring of the STHT time for a "time out" condition. In a time out condition, the ring is reconfigured into a standard FDDI dual ring. Generally speaking, in step 100, the $n_{i+1}$ order sub-ring sub-token holder passes a newly generated data frame downstream. In accordance with the general methodology, Station 18g then passes a new data frame downstream intended for station 18j on second order sub-ring 302.

Referring to FIGS. 5c and 5a, the timer is continually monitored by each sub-ring's sub-token holder as shown in step 102 for a time out condition as shown by the inquiry of step 104. The time out condition is met when the timer element 27 has detected a time exceeding the STHT time allotted. If there is no time out condition then the general steps are repeated wherein step 106 recontinues into step 76 as the new data frame is passed downstream on the sub-ring. If there is a time out condition met, then each sub-token holder must remove its sub-token and data frame, and each sub-token generator must reconfigure the dual ring to return to the physical topology of FIG. 1, as shown in steps 110 and 112. The general process ends in step 114.

Figure 8:
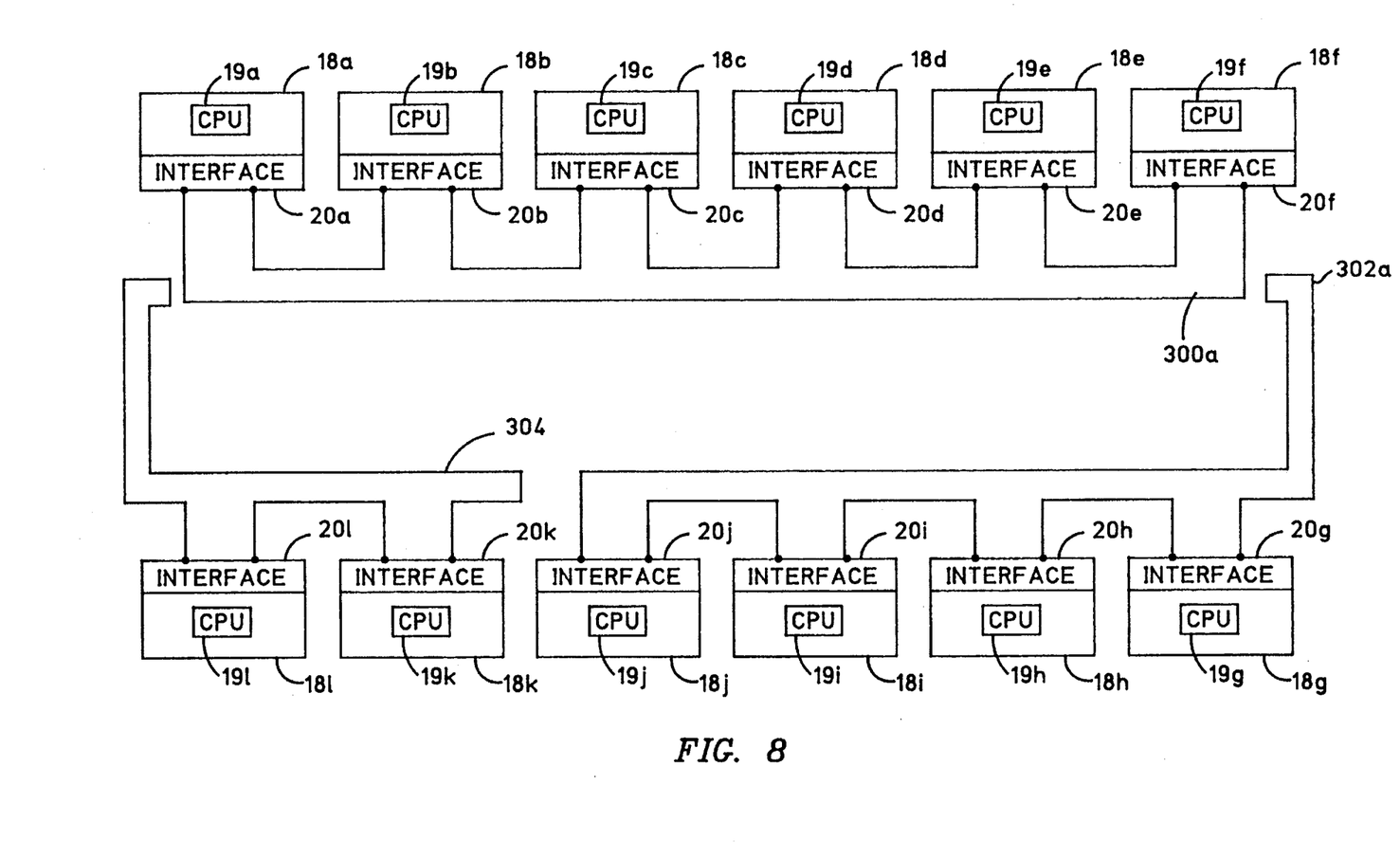

For the sake of clarity, it is best to continue with the example to further illustrate the steps of FIGS. 5a–5c. Referring to FIGS. 7 and 8, assuming station 18j can generate a sub-token frame, then it will pass that frame downstream and reconfigure affected sub-ring 302 (FIG. 7) into sub-ring 302a (FIG. 8). Sub-ring 300a, the first order sub-ring will not be affected by this reconfiguration. The newly generated third order sub-ring 304 will accommodate the new sub-token frame and the acknowledgement for station 18g will be passed on sub-ring 302a.

Figure 9:
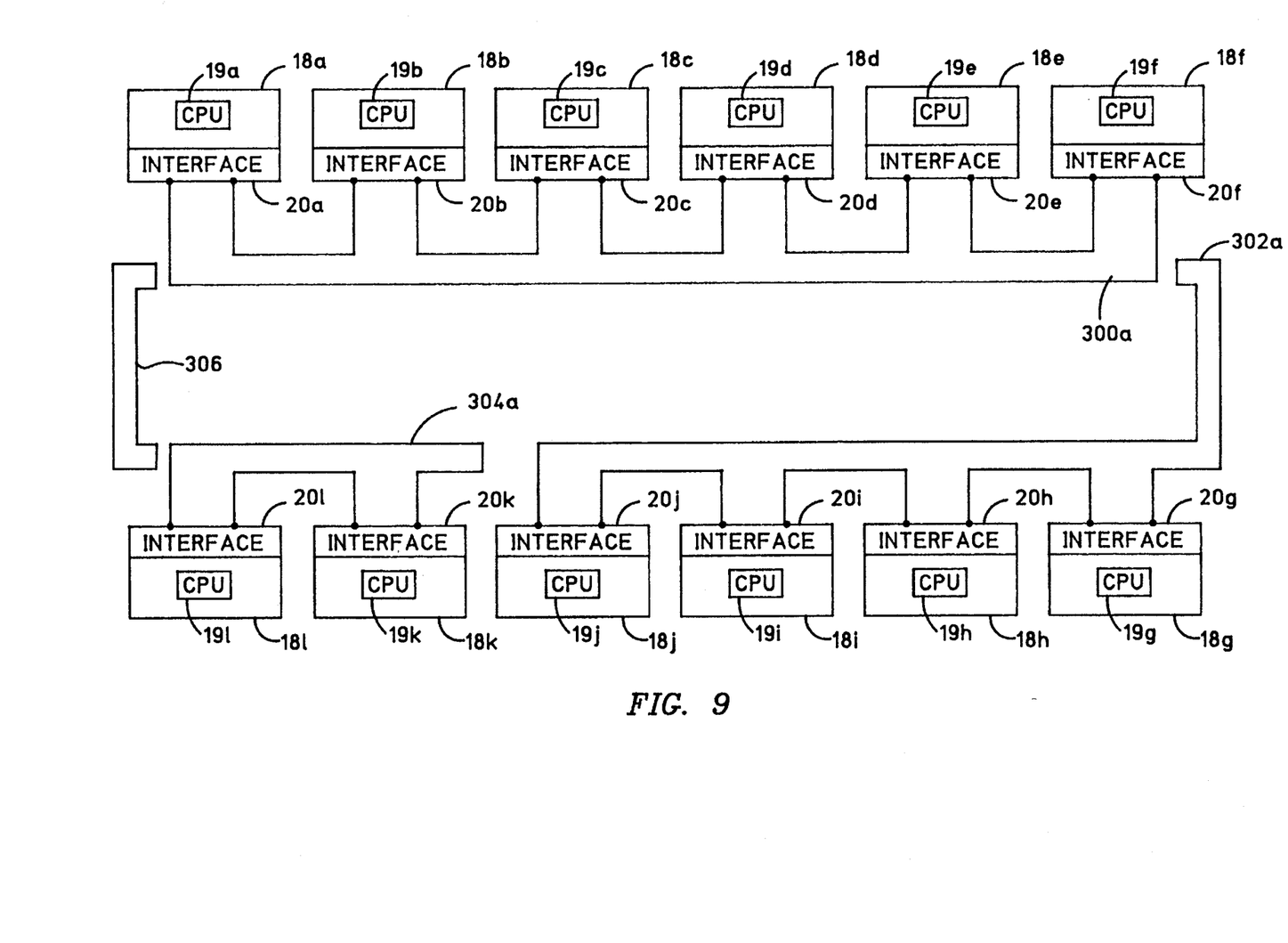

Referring to FIG. 9, station 20k and 20l form the third order sub-ring. Station 201 may receive data from station 20k, but station 20l may not seize a sub-token frame generated by 20l and form a fourth order sub-ring. This is because there are no downstream stations from station 20l. Thus, an isolated sub-ring 306 will be created if station 20l attempts to create this erroneous condition. This isolated sub-ring is incapable of passing data because it has no stations. Also, the third order sub-ring would be reconfigured as sub-ring 304a if this error occurred. Eventually, the STHT times will be exceeded and the topology will return to that shown in FIG. 1.

A preferred embodiment of the present invention has been described for improving the performance of a dual token ring network, such as the FDDI class A network, by physically reconfiguring the topology of the dual rings to create a plurality of sub-rings and then restoring the dual ring topology. Modifications and adaption thereof may occur to persons skilled in the art, in light of the teachings herein. Therefore, protection afforded the present invention should only be limited in accordance with the scope of the following claims.

What is claimed is:

1. A method for operating a dual token ring network having a plurality of stations connected by the dual ring network for passing a main token to be seized and held for a main token holding time by a station denoted as the sender station that has data to transmit, the dual ring having a primary ring and a secondary ring, wherein each station in the dual token ring network has an address, the method comprising the steps of:

the sender station seizing the token and reconfiguring the dual ring into a single first order sub-ring containing all the stations;

the sender station passing a data frame addressed to a receiver station;

the receiver station generating a second order sub-token and passing it downstream, and further dividing the first order sub-ring into a reconfigured first order sub-ring and a second order sub-ring, wherein the reconfigured first order sub-ring contains the sender station and the receiver station, and the second order sub-ring contains all stations that are located downstream to the receiver, wherein any station on the second order sub-ring may seize the second order sub-token and transmit data on the second order sub-ring; and the sender station reconfiguring the dual ring when the main token holding time has expired.

2. The method of claim 1, and further comprising the steps of:

a station on the second order sub-ring seizing the second order sub-token and transmitting a data frame addressed to a receiver station in the second order sub-ring.

3. The method of claim 2, and further comprising the steps of:

the receiver station in the second order sub-ring in response to receiving the data frame generating a third order sub-token and passing it downstream and dividing the second order sub-ring into a reconfigured second order sub-ring and a third order sub-ring, wherein the reconfigured second order sub-ring contains each station located downstream from the station generating the second order sub-token up to and including the receiver station in the second sub-ring, and the third order sub-ring contains all stations that are located downstream from the receiver station in the second sub-ring.

4. The method of claim 2, wherein additional orders of sub-rings are created until either of the following conditions is met:

(a) there are no more stations downstream of a station generating a sub-token; or (b) the main token holding time has expired.

5. The method of claim 1, wherein the data frame transmitted by the sender station has a sub-token holding time (STHT) field that contains a value representing a STHT time, and the value indicates that the STHT time is less than the main token holding time and defines how long the first order sub-ring may exist.

6. The method of claim 1, wherein the data frame transmitted by the sender station has a generate sub-token field (GST) that indicates if a sub-token may be generated by the receiver station.

7. The method of claim 6, further comprising the step of:

responsive to an indication in the GST field that the receiver station may generate a sub-token, the receiving station generating the sub-token and passing the sub-token downstream.

8. A method for operating a dual token ring network having a plurality of stations connected by the dual ring network for passing a main token to be seized and held for a main token holding time by a station denoted as the sender station that has data to transmit, the dual ring having a primary ring and a secondary ring, wherein each station in the dual token ring network has an address, the method comprising the steps of:

the sender station seizing the token and reconfiguring the dual ring into a single first order sub-ring containing all the stations;

the sender station passing a data frame addressed to a receiver station, wherein the data frame transmitted by the sender station has a sub-token holding time (STHT) field that is less than the main token holding time and defines how long the first order sub-ring may exist;

the receiver station creating a second order sub-token and passing it downstream, and further dividing the first order sub-ring into a reconfigured first order sub-ring and a second order sub-ring, wherein the reconfigured first order sub-ring contains the sender station and the receiver station, and the second order sub-ring contains all stations that are located downstream to the receiver;

a station on the second order sub-ring seizing the second order sub-token and transmitting a data frame addressed to a downstream receiver station in the second order sub-ring; and the dual ring being reconfigured when the STHT field indicates that the main token holding time has expired.

9. The method of claim 8, wherein additional orders of sub-rings may be created from the reconfigured dual ring until one of the following conditions is met:

(a) there are no more stations downstream of a station generating a sub-token; or (b) the main token holding time has expired.

10. The method of claim 8, wherein the data frame transmitted by the sender station has a sub-token holding time (STHT) field that is less than the main token holding time and defines how long the first order sub-ring may exist.

11. The method of claim 8, wherein the data frame transmitted by the sender station has a generate sub-token field (GST) that indicates if a sub-token may be generated by the receiver station.

12. The method of claim 11, and further comprising the step of:

responsive to an indication in the GST field that the receiver station may generate a sub-token, the receiving station generating the sub-token and passing the sub-token downstream.

13. A method for operating a dual token ring network having a plurality of stations connected by the dual ring network for passing a main token to be seized and held for a main token holding time by a station denoted as the sender station that has data to transmit, the dual ring having a primary ring and a secondary ring, wherein each station in the dual token ring network has an address, the method comprising the steps of:

the sender station seizing the token and reconfiguring the dual ring into a single first order sub-ring containing all the stations;

the sender station passing a data frame addressed to a receiver station, wherein the data frame transmitted by the sender station has a sub-token holding time (STHT) field that is less than the main token holding time and defines how long the first order sub-ring may exist and the data frame transmitted by the sender station further has a generate sub-token field (GST) that indicates if a sub-token may be generated by the receiver station;

responsive to an indication in the GST field that the receiver station may generate a second order sub-token, the receiving station generating the second order sub-token and passing the sub-token downstream;

the receiver station creating a second order sub-token and passing it downstream, and further dividing the first order sub-ring into a reconfigured first order sub-ring and a second order sub-ring, wherein the reconfigured first order sub-ring contains the sender station and the receiver station, and the second order sub-ring contains all stations that are located downstream to the receiver;

a station on the second order sub-ring seizing the second order sub-token and transmitting a data frame addressed to a downstream receiver station in the second order sub-ring; and the dual ring being reconfigured when the STHT field indicates that the main token holding time has expired.

14. A system for operating a dual token ring network having a plurality of stations connected by the dual ring network for passing a main token to be seized and held for a main token holding time by a station denoted as the sender station, that has data to transmit, the dual ring having a primary ring and a secondary ring, wherein each station in the dual token ring network has an address, the system comprising:

one or more interface units, wherein each interface unit of the one or more interface units is coupled to each respective addressable station in the network that is capable of transmitting data on the ring;

a control unit coupled to each interface unit, the control unit having control logic for controlling the interface unit;

each interface unit further having a control timing element and sub-token generating logic that is controlled by the control logic in the control unit; and the control logic adapted to implement a protocol to control the interaction of the following control logic activated steps:

the sender station seizing the token and reconfiguring the dual ring into a single first order sub-ring containing all the stations;

the sender station passing a data frame addressed to a receiver station;

the receiver station creating a second order sub-token and passing it downstream, and further dividing the first order sub-ring into a reconfigured first order sub-ring and a second order sub-ring, wherein the reconfigured first order sub-ring contains the sender station and the receiver station, and the second order sub-ring contains all stations that are located downstream to the receiver, wherein any station on the second order sub-ring may seize the second order sub-token and transmit data on the second order sub-ring; and the sender station reconfiguring the dual ring when the control timing element indicates that the main token holding time has expired.

15. The system of claim 14, wherein the control logic activated steps further include:

a station on the second order sub-ring seizing the second order sub-token and transmitting a data frame addressed to a downstream receiver station in the second order sub-ring.

16. The system of claim 14, wherein the control logic activated steps further include:

the downstream receiver station in the second order sub-ring in response to receiving the data frame generating a third order sub-token and passing it downstream and dividing the second order sub-ring into a reconfigured second order sub-ring and a third order sub-ring, wherein the reconfigured second order sub-ring contains the station immediately downstream from the second order sub-token generator and the downstream receiver station in the second sub-ring, and the third order sub-ring contains all stations that are located downstream from the downstream receiver station in the second sub-ring.

17. The system of claim 15, wherein additional orders of sub-rings are created until either of the following conditions is met:

(a) there are no more stations downstream of a station generating a sub-token; or (b) the main token holding time has expired.

18. The system of claim 14, wherein the data frame transmitted by the sender station has a sub-token holding time (STHT) field that contains a value representing STHT time and the value indicates that the STHT time is less than the main token holding time and defines how long the first order sub-ring may exist.

19. The system of claim 14, wherein the data frame transmitted by the sender station has a generate sub-token field (GST) that indicates if a sub-token may be generated by the receiver station.

20. The system of claim 19, wherein the control logic activated steps further include:

responsive to an indication in the GST field that the receiver station may generate a sub-token, the receiving station generating the sub-token and passing the sub-token downstream.

21. An interface unit for implementing a protocol for operating a dual token ring network having a plurality of stations connected by the dual ring network for passing a main token to be seized and held for a main token holding time by a station denoted as the sender station, that has data to transmit, the dual ring having a primary ring and a secondary ring, wherein each station in the dual token ring network has an address, the interface unit comprising:

a control processor with control logic for implementing the protocol;

sub-token generating logic controlled by the control logic for generating a sub-token;

a control timing element coupled to the control processor for ensuring that a sub-token can not exist past the main token holding time;

a plurality of switches coupled to the control timing element;

the control timing element being controlled by the control logic to control positioning of each switch of the plurality of switches;

the plurality of switches including:

a first switch having a first and a second switchable position, the first switchable position placing a station in listen mode so that the station is capable of receiving a data frame passed from the sender station and a second switchable position for disconnecting from downstream stations;

a second switch having a first switchable position and a second switchable position, the first switchable position placing a station in listen mode in a first state capable of receiving a data frame passed from the sender station and the second switchable position for entering transmit mode and transmitting the generated sub-token downstream; and a third switch and a fourth switch, each switch having an identical first switchable position and an identical second switchable position, the first switchable position for allowing the interface to be connected to the dual ring configuration and the second switchable position for disconnecting the interface from the dual ring and connecting the interface to either the primary ring or the secondary ring.

22. A computer program product comprising:

a computer usable medium having computer readable program code embodied therein for operating a dual token ring network having a plurality of stations connected by the dual ring network for passing a main token to be seized and held for a main token holding time by a station denoted as the sender station, that has data to transmit, the dual ring having a primary ring and a secondary ring, wherein each station in the dual token ring network has an address, the computer program code adapted to activate and execute the following steps on the dual ring:

the sender station seizing the token and reconfiguring the dual ring into a single first order sub-ring containing all the stations;

the sender station passing a data frame addressed to a receiver station;

the receiver station creating a second order sub-token and passing it downstream, and further dividing the first order sub-ring into a reconfigured first order sub-ring and a second order sub-ring, wherein the reconfigured first order sub-ring contains the sender station and the receiver station, and the second order sub-ring contains all stations that are located downstream to the receiver, wherein any station on the second order sub-ring may seize the second order sub-token and transmit data on the second order sub-ring; and the sender station reconfiguring the dual ring when the main token holding time has expired.

23. The computer program product of claim 22, wherein the program code is further adapted to activate and execute the following step of:

a station on the second order sub-ring seizing the second order sub-token and transmitting a data frame addressed to a downstream receiver station in the second order sub-ring.

24. The computer program product of claim 22, wherein the program code is further adapted to activate and execute the following step of:

the downstream receiver station in the second order sub-ring in response to receiving the data frame generating a third order sub-token and passing it downstream and dividing the second order sub-ring into a reconfigured second order sub-ring and a third order sub-ring, wherein the reconfigured second order sub-ring contains the station immediately downstream from the second order sub-token generator and the downstream receiver station in the second sub-ring, and the third order sub-ring contains all stations that are located downstream to the downstream receiver station in the second sub-ring.

25. The computer program product of claim 23, wherein additional orders of sub-rings are created until either of the following conditions is met:

(a) there are no more stations downstream of a station generating a sub-token; or (b) the main token holding time has expired.

26. The computer program product of claim 22, wherein the data frame transmitted by the sender station has a sub-token holding time (STHT) field and the value of the STHT time is less than the main token holding time and defines how long the first order sub-ring may exist.

27. The computer program product of claim 23, wherein the data frame transmitted by the sender station has a generate sub-token field (GST) that indicates if a sub-token may be generated by the receiver station.

28. The computer program product of claim 27, wherein the program code is further adapted to activate and execute the following step of:

responsive to an indication in the GST field that the receiver station may generate a sub-token, the receiving station generating the sub-token and passing the sub-token downstream.

* * * * *